(12) United States Patent
Amon et al.

(10) Patent No.: US 10,250,874 B2
(45) Date of Patent: *Apr. 2, 2019

(54) METHOD FOR CODING SEQUENCE OF DIGITAL IMAGES

(71) Applicant: SIEMENS AKTIENGESELLSCHAFT, München (DE)

(72) Inventors: Peter Amon, München (DE); Andreas Hutter, München (DE); André Kaup, Effeltrich (DE); Eugen Wige, Dresden (DE)

(73) Assignee: Siemens Aktiengesellschaft, München (DE)

( * ) Notice: Subject to any disclaimer, the term of this patent is extended or adjusted under 35 U.S.C. 154(b) by 255 days.

This patent is subject to a terminal disclaimer.

(21) Appl. No.: 14/783,731

(22) PCT Filed: Jul. 26, 2013

(86) PCT No.: PCT/EP2013/065830
§ 371 (c)(1),
(2) Date: Oct. 9, 2015

(87) PCT Pub. No.: WO2014/166553
PCT Pub. Date: Oct. 16, 2014

(65) Prior Publication Data
US 2016/0212420 A1    Jul. 21, 2016

(30) Foreign Application Priority Data

Apr. 9, 2013 (EP) ..................................... 13162910

(51) Int. Cl.
*H04N 19/103* (2014.01)
*H04N 19/105* (2014.01)
(Continued)

(52) U.S. Cl.
CPC ......... *H04N 19/103* (2014.11); *G06K 9/6215* (2013.01); *H04N 19/105* (2014.11);
(Continued)

(58) Field of Classification Search
CPC .... H04N 19/567; H04N 19/44; H04N 19/105; H04N 19/182; H04N 19/51;
(Continued)

(56) References Cited

U.S. PATENT DOCUMENTS 5,631,979 A * 5/1997 Cok ........................ G06T 9/004
348/246
2006/0158355 A1* 7/2006 Jeon ..................... H04N 19/176
341/50
(Continued)

FOREIGN PATENT DOCUMENTS

CN     101099391 A     1/2008
CN     101682770 A     3/2010
(Continued)

OTHER PUBLICATIONS

Matthieu Moinard et al., "A Set of Template Matching Predictors for Intra Video Coding", Acoustics Speech and Signal Processing (ICASSP), 2010 IEEE International Conference on, IEEE, Piscataway, NJ, USA, (Mar. 14, 2010), pp. 1422-1425, XP031697408, ISBN: 978-1-4244-4295-9.*

(Continued)

*Primary Examiner* — Dramos Kalapodas
(74) *Attorney, Agent, or Firm* — Lempia Summerfield Katz LLC (57) ABSTRACT

In a method for coding a sequence of digital images, a prediction error between predicted values and the original values of pixels is processed for generating the coded sequence of digital images. A preset prediction mode is an intra-prediction mode based on pixels of a single image and
(Continued)

includes, for a region of pixels with reconstructed values in the single image and for a template of an image area, comparing a first patch of pixels in the region that surround a first pixel to be predicted based on the template with several second patches. A predicted value of the first pixel is determined based on the values of one or more second pixels that have the highest similarity described by the similarity measure among all second pixels of the plurality of second pixels in the region.

21 Claims, 4 Drawing Sheets

(51) Int. Cl.
| | | |
|---|---|---|
| H04N 19/176 | (2014.01) | |
| H04N 19/593 | (2014.01) | |
| H04N 19/14 | (2014.01) | |
| H04N 19/124 | (2014.01) | |
| H04N 19/167 | (2014.01) | |
| H04N 19/44 | (2014.01) | |
| H04N 19/61 | (2014.01) | |
| H04N 19/65 | (2014.01) | |
| H04N 19/70 | (2014.01) | |
| G06K 9/62 | (2006.01) | |
| H04N 19/46 | (2014.01) | |
| H04N 19/11 | (2014.01) | |

(52) U.S. Cl.
CPC ........... *H04N 19/124* (2014.11); *H04N 19/14* (2014.11); *H04N 19/167* (2014.11); *H04N 19/176* (2014.11); *H04N 19/44* (2014.11); *H04N 19/593* (2014.11); *H04N 19/61* (2014.11); *H04N 19/65* (2014.11); *H04N 19/70* (2014.11); *H04N 19/11* (2014.11); *H04N 19/46* (2014.11)

(58) Field of Classification Search
CPC .. H04N 19/513; H04N 19/587; H04N 19/593; H04N 19/61; H04N 19/537; H04N 19/573; H04N 19/103; H03M 7/00
See application file for complete search history.

(56) References Cited

U.S. PATENT DOCUMENTS

| | | | | |
|---|---|---|---|---|
| 2009/0116759 A1* | 5/2009 | Suzuki | ............... | H04N 19/61 382/238 |
| 2009/0180538 A1* | 7/2009 | Visharam | ............ | H04N 19/176 375/240.15 |
| 2011/0109753 A1* | 5/2011 | Srinivasamurthy | .... | H04N 19/46 348/208.4 |
| 2016/0057438 A1* | 2/2016 | Yamamoto | ............ | H04N 19/30 382/233 |

FOREIGN PATENT DOCUMENTS

| | | |
|---|---|---|
| WO | WO2008010680 A1 | 1/2008 |
| WO | WO2008108534 A1 | 9/2008 |
| WO | WO2014094829 A1 | 6/2014 |

OTHER PUBLICATIONS

Guionnet T et al., "Non-CE6: Intra Prediction Based on Weighted Template Matching Predictors (WTM)", 7. JCT-VC Meeting; 98. MPEG Meeting; Nov. 21, 2011-Nov. 30, 2011; Geneva; (JCTVC of ISO/I EC JTC1/SC29/WG11 and ITU-T SG.16 ); JCTVC-G598, (Nov. 9, 2011), XP030110582.*

Matthieu Moinard et al., "A Set of Template Matching Predictors for Intra Video Coding", Acoustics Speech and Signal Processing (ICASSP), 2010 IEEE International Conference on, IEEE, Piscataway, (Year: 2010).*

Amon et al., "Intra prediction for lossless coding," 12. JCT-VC Meeting, 103. MPEG Meeting, Jan. 13, 2014-Jan. 23, 2013, Geneva, (Joint Collaborative Team on Video Coding of ISO/IEC JTC1/SC29/WG11 and ITU-T SG.16), URL: Http://WFTP3.ITU.INT/AV-ARCH/JCTVC-SITE/,,no.JCTVC-L0161, XP030113649, 2013.

Guionnet et al., "Non-CE6: Intra prediction based on weighted template matching predictors (WTM)," 7th JCT-VC Meeting, Joint collaborative team on video coding of IT-T SG16 WP3 and ISO/IEC JTC1/SC29/WG11, pp. 1-8, 2011.

Moinard et al. "A set of template matching predictors for intra video coding," Acoustics speech and signal processing (ICASSP), IEEE International conference, pp. 1422-1425, 2010.

PCT International Search Report and Written Opinion of the International Searching Authority dated Sep. 10, 2013 for corresponding PCT/EP2013/065830.

Sullivan et al., "Overview of the high efficiency video coding (HEVC) Standard," IEEE Transactions on Circuits and Systems for Video Technology, vol. 22, No. 12, pp. 1649-1668, Dec. 2012.

Tan et al., "Intra prediction by averaged template matching predictors," Consumer Communications and Networking conference, CCNC, pp. 405-409, 2007.

Türkan et al., "Image prediction based on neighbor-embedding methods," IEEE Transactions on Image Processing, vol. 21, No. 4, pp. 1885-1898, 2012.

Weinberger et al., "The LOCO-I Lossless Image Compression Algorithm: Principles and Standardization into JPEG-LS," IEEE Trans. Image Processing, vol. 9, pp. 1309-1324, Aug. 2000.

Wiegand et al., "Overview of the H.264/AVC Video Coding Standard," IEEE Transactions on Circuits and Systems for Video Technology, vol. 13, No. 7, pp. 560-576, Jul. 2003.

Chinese Office Action for related Chinese Application No. 201380075459.1 dated Sep. 29, 2017.

Sole Joel et al.: "CE11: Unified scans for the significance map and coefficient level coding in high efficiency"; Joint Collaborative Team on Video Coding (JCT-VC) of ITU-T SG16 WP3 and ISO/IEC JTC1/SC29/WG11; 6th Meeting: Torino, IT, Jul. 14-22, 2011.

\* cited by examiner

METHOD FOR CODING SEQUENCE OF DIGITAL IMAGES

This application is the National Stage of International Application No PCT/EP2013/065830, filed Jul. 26, 2013, which claims the benefit of European Patent Application No. EP 13162910.7, filed Apr. 9, 2013. The entire contents of these documents are hereby incorporated herein by reference.

BACKGROUND

The present embodiments refer to coding a sequence of digital images as well as to a corresponding decoding.

In many different applications (e.g., in surveillance systems or in medical imagery apparatus), a great amount of image and video data is produced. Hence, there is a need to compress this data in order to save storage capacity or to reduce the bandwidth when transmitting the data.

In the prior art, there exist a lot of standards in order to compress image and video data. Prominent examples of the standards are H.264/advanced video coding (AVC) see "Overview of the H.264/AVC Video Coding Standard," by Thomas Wiegand, Gary J. Sullivan, Gisle Bjontegaard, and Ajay Luthra, IEEE TRANSACTIONS ON CIRCUITS AND SYSTEMS FOR VIDEO TECHNOLOGY, Vol 13, No. 7, July 2003), as well as the draft standard high efficiency video coding (see "Overview of the High Efficiency Video Coding (HEVC) Standard," Gary J. Sullivan, Jens-Rainer Ohm, Woo-Jin Han, and Thomas Wiegand, IEEE TRANS, ON CIRCUITS AND SYSTEMS FOR VIDEO TECHNOLOGY, Vol. 22, No. 12, pp. 1649-1668, December 2012), which will be standardized also as ITU-T Recommendation H.265. The standard HEVC will also allow the real-time transmission of lossless coded image sequences. The standards HEVC and H.264/AVC include different intra prediction modes based on blocks in the same image. In those modes, a current block is predicted for already reconstructed pixels in the neighborhood. An encoder may test different prediction types and chooses the prediction type with minimal cost with respect to a certain distortion criterion. The prediction error is built for the current block and is transmitted to the decoder together with the prediction type. Block-wise prediction has the disadvantage that pixels that are far away from the reference pixels used for prediction do not correlate well with the reference pixels. Hence, the prediction error may be higher for those pixels. In order to improve the prediction, the size of a block may be reduced. However, this results in a higher number of blocks in an image, which leads to a higher bitrate for signaling of the prediction type. If the reference pixels contain noise, those pixels become suboptimal for prediction.

A simple and efficient pixel-wise prediction method is proposed in "The LOCO-I lossless image compression algorithm: Principles and standardization into JPEG-LS," by Marcelo J Weinberger, Gadiel Seroussi, and Guillermo Sapiro, IEEE Transactions on Image Processing, August 2000. This prediction method named LOCO-I uses a simple and straight forward algorithm to predict a pixel based on three surrounding pixels. This prediction method is not optimal for compression for noisy images, either.

In "Intra prediction for lossless coding", by Peter Amon, Andreas Hutter, Eugen Wige, and André Kaup, ISO/IEC JTCI/SC29/ WG11 and ITU-T SG16 WP3, document JCTVC-L0161/M27497, Geneva, Switzerland, January 2013, as well as in International patent application No. PCT/EP2012/075988, a template based prediction is disclosed where a predicted value of a pixel is determined by comparing a patch according to the template around the pixel with other patches according to the template around pixels in the neighborhood of the pixel to be predicted. As a result of this comparison, similarity measures between the patches are determined. The prediction is based on a weighted sum of the pixel values in the neighborhood taking into account a similarity measure, where lower similarity measures result in lower weights. This prediction method is rather complex and not suited for special types of contents (e.g., the content of a computer screen).

SUMMARY AND DESCRIPTION

The scope of the present invention is defined solely by the appended claims and is not affected to any degree by the statements within this summary.

The present embodiments may obviate one or more of the drawbacks or limitations in the related art. For example, a coding of a sequence of digital images overcoming the above disadvantages and enabling an efficient compression with low complexity is provided. As other examples, a corresponding decoding method as well as an apparatus for coding and an apparatus for decoding are provided.

The method for coding a sequence of digital images according to the present embodiments uses a number of prediction modes (e.g., at least one prediction mode) for predicting values of pixels in the images based on reconstructed values of pixels in image areas processed previously. The term "reconstructed values of pixels" is to be interpreted broadly and depends on the used coding scheme. For lossless coding, the reconstructed values of pixels correspond to the original value of pixels. In case of a lossy coding, the reconstructed values of pixels correspond to coded and thereafter decoded values of pixels. Moreover, the reconstructed values of pixels may also refer to predicted values of pixels determined in the corresponding prediction mode. Predicted values of pixels are used in case that a coding and decoding of the respective pixel has not yet been performed when predicting the current pixel.

In the coding method, a prediction error between predicted values and the original values of pixels is processed for generating the coded sequence of digital images.

The method of the present embodiments is characterized by a special preset prediction mode, which is an intra-prediction mode based on pixels of a single image. This preset prediction mode includes acts i) and ii) as explained in the following.

In act i), for a region of pixels with reconstructed values in a single image and for a template of an image area, a first patch of pixels in the region that surround a first pixel to be predicted based on the template is compared with several second patches. Each of the second patches are assigned to a second pixel from a plurality of second pixels in the region and consists of pixels in the region that surround the second pixel based on the template. Based on this comparison, a similarity measure for each second pixel that describes the similarity between reconstructed values of the pixels of the second patch assigned to the respective second pixel and the reconstructed values of the pixels of the first patch is determined.

In act ii) of the method, a predicted value of the first pixel is determined based on the values of one or more second pixels that have the highest similarity described by the similarity measure among all second pixels of the plurality of second pixels in the region.

The present embodiments are based on the idea that the complexity of the prediction as described in "Intra prediction for lossless coding", by Peter Amon, Andreas Hutter, Eugen Wige, and André Kaup, ISO/IEC JTC1/SC29/WG11and ITU-T SG16 WP3, document JCTVC-L0161/M27497, Geneva, Switzerland, January 2013 and International patent application No. PCT/EP2012/075988 may be reduced by determining a predicted value not on a weighted sum of pixels but on a pixel having the highest similarity according to the similarity measure. The whole disclosure of "Intra prediction for lossless coding", by Peter Amon, Andreas Hutter, Eugen Wige, and André Kaup, ISO/IEC JTC1/SC29/WG11and ITU-T SG16 WP3, document JCTVC-L0161/M27497, Geneva, Switzerland, January 2013 document [4] and above mentioned International patent application is incorporated by reference in the instant application.

The method of the present embodiments provides an efficient coding particularly for screen content without the need of solving a linear system of equations as it is the case in prior art methods. There is no restriction in the number of second pixels to be used for predicting a first pixel. No or less side information needs to be transmitted from the encoder to the decoder because the prediction scheme according to the present embodiments is backward adaptive. The prediction is carried out sample-based so that the prediction error does not depend on the pixel position.

In an embodiment, the predicted value of the first pixel is the value of a single second pixel that has the highest similarity described by the similarity measure among all second pixels of the plurality of second pixels in the region. If there are several second pixels having the highest similarity, the single second pixel is chosen by a predetermined order of second pixels in the plurality of second pixels, where the single second pixel is the second pixel having at first the highest similarity in the predetermined order of second pixels. Alternatively or additionally, the predicted value of the first pixel may also be determined based on the values of all second pixels that have the highest similarity described by the similarity measure in the plurality of second pixels in the region. In case that there is only a single second pixel having the highest similarity, the predicted value of the first pixel is the value of this single second pixel. If several second pixels having the highest similarity exist, the predicted value of the first pixel is a combination and particularly a linear combination of the values of the several second pixels, (e.g., the mean of the values of the second several pixels). The above described two variants provide efficient mechanisms for dealing with cases where several pixels with the same maximum similarity measure exist.

In another embodiment, the preset prediction mode is performed block-wise for first pixels in predetermined image blocks. Hence, the method may be easily combined with block-based coding schemes.

In an embodiment, the similarity measure is based on the sum of absolute differences between corresponding pixels (e.g., reconstructed pixels) in the first patch and the respective second patch. However, also the sum of squared differences between corresponding pixels in the first patch and the respective second patch may be used for defining the similarity measure.

In another embodiment, the single image is a two-dimensional image with pixels at a plurality of vertical and horizontal positions. The plurality of second pixels in the region and/or the template is defined such that the plurality of second pixels in the region and/or the template surround a corresponding pixel by at least two adjacent pixels. The corresponding pixel is the first pixel in case of defining the plurality of second pixels in the region and the corresponding pixel is the pixel surrounded by the first patch or the second patch based on the template in case of defining a template. The at least two adjacent pixels include an upper adjacent pixel having a vertical position being offset upwards by one pixel with respect to the corresponding pixel and having the same horizontal position as the corresponding pixel in the single image; a left adjacent pixel having a horizontal position being offset to the left by one pixel with respect to the corresponding pixel and having the same vertical position as the corresponding pixel in the single image; and optionally, an upper-left pixel having a vertical position being offset upwards by one pixel with respect to the corresponding pixel and having a horizontal position being offset to the left by one pixel with respect to the corresponding pixel in the single image.

In one embodiment, the plurality of second pixels in the region and/or the template further include an upper-right pixel having a vertical position being offset upwards by one pixel with respect to the corresponding pixel and having a horizontal position being offset to the right by one pixel with respect to the corresponding pixel in the single image.

The above methods defining the plurality of second pixels in the region based on adjacent pixels may be combined with an embodiment where a predetermined order is given for choosing a second pixel for prediction in case of several second pixels with the highest similarity. To do so, the predetermined order in the plurality of second pixels may be defined as follows: the upper adjacent pixel, the left adjacent pixel, the upper-left pixel, and in case that the plurality of second pixels also includes the upper-right pixel, the upper-right pixel.

Alternatively, the predetermined order in the plurality of second pixels may be defined as follows: the upper adjacent pixel, the upper-right pixel (if present), the left adjacent pixel and the upper-left pixel.

In one embodiment, the preset prediction mode is used for lossless coding of the sequence of images. In this case, reconstructed values of pixels used in act i) are equal to the original values of pixels.

In another embodiment, the preset prediction mode is used for lossy coding of the sequence of images. In one embodiment, the lossy coding includes the known acts of a transform and/or a quantization of the (transformed) prediction errors, where an inverse transform and/or a dequantization of the prediction errors are performed for determining reconstructed values of pixels. In case that a prediction error for a pixel has not yet been subjected to the transform and/or quantization, the predicted value of the pixel is used as the reconstructed value.

In one embodiment, the processing of the prediction error includes an entropy coding act enhancing the coding efficiency.

In another embodiment, the method includes a predetermined prediction mode besides the preset prediction mode, where the predetermined prediction mode includes the same act i) as the preset prediction mode but a different act ii) in which a predicted value of the first pixel is determined based on a weighed sum of values of the second pixels of the plurality of second pixels in the region. The value of each second pixel is weighted by a weighting factor. In this embodiment, the preset prediction mode is used for the first pixel as an alternative to the predetermined prediction mode in case that all weighting factors of the weighted sum are zero. In one variant of this embodiment, the prediction mode as defined in "Intra prediction for lossless coding", by Peter Amon, Andreas Hutter, Eugen Wige, and André Kaup, ISO/IEC JTC1/SC29/WG11and ITU-T SG16 WP3, document JCTVC-L0161/M27497, Geneva, Switzerland, January 2013 and International patent application No. PCT/EP2012/075988 is used as the predetermined prediction mode. When using this prediction mode, the weighting factor is monotonously decreasing in dependency on a decreasing similarity described by the similarity measure for the respective second pixel.

In another variant, one or more of the parameters of the preset prediction mode may be fixed and/or variable. The one or more parameters may include the form and the size of the template and/or the form and the size of the region and/or one or more parameters referring to the determination of the similarity measures and/or a determination of predicted values of first pixels.

In another embodiment, the preset prediction mode and/or parameters of the preset prediction mode are signaled in the coding sequence of images. In the detailed description, different variants for signaling the prediction mode or corresponding parameters are described.

In a variant, the preset prediction mode is used as a prediction mode in the standard HEVC/H.265, for which a draft version exists at the moment.

Besides the above method, the present embodiments also refer to a method for decoding a sequence of digital images, which is coded by the coding method of the present embodiments or one or more alternative embodiments of the coding method. In the decoding method, the prediction error is reconstructed from the coded sequence of images and the values of the pixels in the coded sequence of images that are processed by the preset prediction mode during coding and are subjected to a special decoding process that includes act i) to iii) as described in the following.

In act i), for a region of pixels with decoded values in a single image that have been determined previously in the decoding processing and for a template of an image area, a first patch of pixels in the region that surrounds a first pixel to be predicted based on the template is compared with several second patches. Each of the second patches is assigned to a second pixel from a plurality of second pixels in the region and consists of pixels in the region that surround the second pixel based on the template. A similarity measure for each second pixel describing the similarity between decoded values of the pixels of the second patch assigned to the respective second pixel and the decoded values of the pixels of the first patch is thereby determined.

In act ii), a predicted value of the first pixel is determined based on the values (e.g., decoded values) of one or more second pixels that have the highest similarity described by the similarity measure among all second pixels of the plurality of second pixels in the region.

In act iii), the predicted value of the first pixel is corrected by the corresponding reconstructed prediction error for the first pixel resulting in a decoded value of the first pixel.

The present embodiments also refers to a method for coding and decoding a sequence of digital images, wherein the sequence of digital images is coded by the coding method of the present embodiments and where the coded sequence of digital images is decoded by the decoding method of the present embodiments.

The present embodiments also include an apparatus for coding a sequence of images wherein the apparatus includes a device for performing an number of prediction modes for predicting values of pixels in the images based on reconstructed values of pixels in image areas processed previously. The prediction error between predicted values and the original values of pixels is processed for generating the coded sequence of digital images.

In this apparatus, the device for performing a number of prediction modes includes a device for performing a preset prediction mode that is an intra-prediction mode based on pixels of a single image. The device for performing the preset prediction mode includes a device for determining similarity measures that is configured to perform an act in which, for a region of pixels with reconstructed values in the single image and for a template of an image area, a first patch of pixels in the region that surround a first pixel to be predicted based on the template is compared with several second patches. Each of the second patches is assigned to a second pixel from a plurality of second pixels in the region and consists of pixels in the region that surround the second pixel based on the template. A similarity measure for each second pixel describing the similarity between reconstructed values of the pixels of the second patch assigned to the respective second pixel and the reconstructed values of the pixels of the first patch is thereby determined. The device for performing the present prediction mode also include a second device for predicting values of first pixels that is configured to perform an actin which a predicted value of a first pixel is determined based on the values of one or more second pixels which have the highest similarity described by the similarity measure among all second pixels of the plurality of second pixels in the region.

The above coding apparatus may include one or more additional devices for performing one or more embodiments of the coding method according to the present embodiments.

The present embodiments also refer to an apparatus for decoding a sequence of digital images that is coded by the method of the present embodiments. The apparatus includes a decoding device to reconstruct the prediction error from the coded sequence of images and to decode the values of the pixels in the coded sequence of images that are processed by the preset prediction mode during coding.

The decoding device of the apparatus includes a device for determining similarity measures that is configured to perform an act in which, for a region of pixels with decoded values in the single image that have been determined previously in the decoding processing and for a template of an image area, a first patch of pixels in the region that surround a first pixel to be predicted based on the template is compared with several second patches. Each of the second patches is assigned to a second pixel from a plurality of second pixels in the region and consists of pixels in the region that surround the second pixel based on the template. A similarity measure for each second pixel describing the similarity between decoded values of the pixels of the second patch assigned to the respective second pixel and the decoded values of the pixels of the first patch is thereby determined. The decoding device includes a device for predicting values of first pixels that is configured to perform an act in which a predicted value of a first pixel is determined based on the values of one or more second pixels that have the highest similarity described by the similarity measure among all second pixels of the plurality of second pixels in the region. The decoding device includes a device for correcting the predicted values of first pixels that is configured to perform an act in which the predicted value of a first pixel is corrected by the corresponding reconstructed prediction error for the first pixel resulting in a decoded value of the first pixel.

The present embodiments also include a codec for coding and decoding a sequence of digital images, which includes a coding apparatus according to the present embodiments and a decoding apparatus according to the present embodiments.

DETAILED DESCRIPTION

The prediction method described in the following is based on intra-prediction and uses for a pixel to be predicted patches based on a template around pixels in a predetermined region of already reconstructed pixels. To do so, similarity measures between a first patch around a first pixel to be predicted and respective second patches around second pixels in the predetermined region are determined as will described in more detail below. The prediction method is implemented as a prediction mode in a coding method and may be particularly used in the video coding (draft) standard HEVC/H.265.

Figure 1:
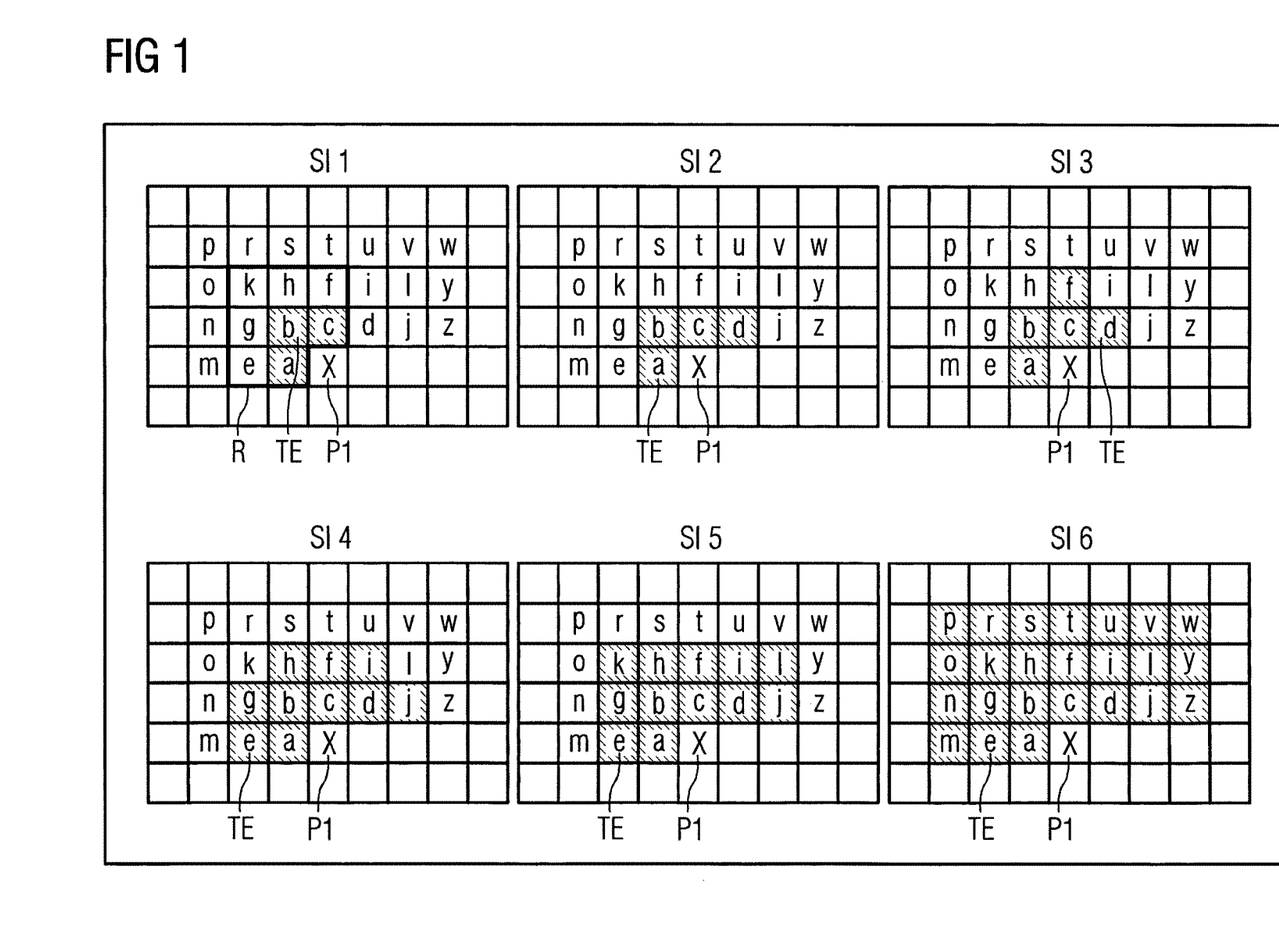
FIG. 1 shows different templates that may be used in the prediction method according to an embodiment.

FIG. 1 illustrates different forms and sizes SI1, SI2, . . . , SI6 of templates for first patches and second patches that may be used in an embodiment. In this figure, a first pixel to be predicted in an image is designated as P1 and has the pixel value X. The coding order is line by line where all pixels in lines above the pixel P1 and all pixels in the line of pixel P1 at the left side of this pixel have already been coded. In order to calculate a similarity measure, patches based on templates according to sizes SI1 to SI6 may be used. The corresponding templates TE are indicated by hatching for each form and size. In other words, the template of form and size SI1 includes pixels a, b, c, the template of form and size SI2 includes pixels a, b, c, d, the template of form and size SI3 includes the pixels e, a, b, c, d, f, and so on.

FIG. 1 also illustrates a region R, that defines a neighborhood region including the pixels that are taken into account when predicting the value for pixel P1. The region includes, for example, second pixels a, b, and c. Respective second patches adjacent to those pixels based on the template TE are used for calculating a similarity measure SM (see FIG. 2). In other words, the first patch including the pixels a, b, and c is compared with the second patch of pixels around pixel a (e.g., pixels e, g, and b), with the second patch of the pixels around pixel b (e.g., pixels g, k, and h) and with the second patch around the pixel c (namely pixels b, h, and f) in order to determine similarity measures between the first and the respective second patch. Hence, the neighborhood region is based on the pixels a, b and c and the pixels in the patches around the second pixels. Analogously, corresponding neighborhood regions are defined for the other sizes SI2 to SI6 by second pixels corresponding to the template and the pixels of the patches around the second pixels. Hence, the definition of a template size also corresponds to a definition of a neighborhood region size. The pixels in a template constitute the plurality of second pixels as defined in the claims.

Figure 2:
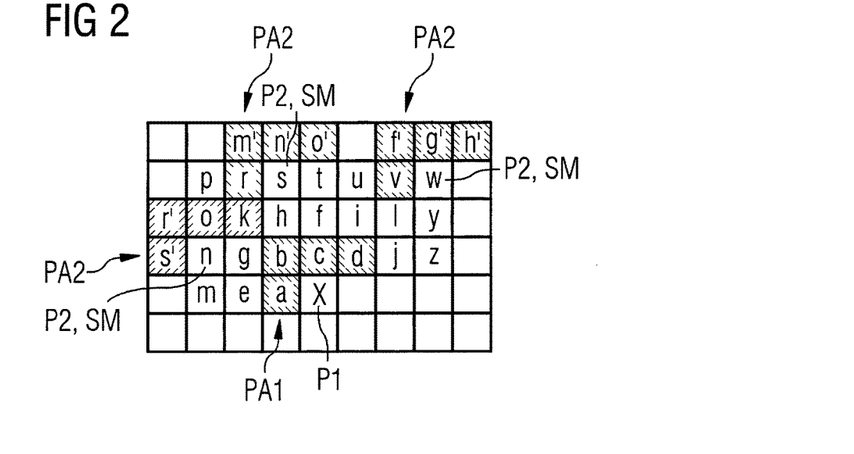
FIG. 2 illustrates the prediction of a pixel based on an embodiment.

The above described calculation of similarity measures for predicting a first pixel P1 is further illustrated in FIG. 2. FIG. 2 uses for the prediction of the pixel P1 patches based on the template of the size SI2 in FIG. 2. The templates have an L-form and includes four pixels. To determine the predicted value of pixel P1, the first patch including pixels a, b, c, and d around P1 is compared with second patches. As an example, second patches around the pixels n, s, and w are highlighted by hatching in FIG. 2. Those pixels are second pixels P2. The corresponding similarity measure SM for each of those pixels is calculated by comparing the pixel values of the first patch PA1 with the corresponding pixels values of the second patch surrounding the corresponding pixel P2. In the embodiment described herein, the sum of the absolute differences of pixel values in the first patch and the second patch are used for determining the similarity measure SM. For example, for pixel P2 having the value s, the absolute difference between the pixel value r of PA2 and pixel value a of PA1, the absolute difference of pixel value m' of PA2 and pixel value b of PA1, the absolute difference of pixel value n' of PA2 and pixel value c of PA1, and the absolute difference of pixel value o' of PA2 and pixel value d of PA1 are summed for calculating the similarity measure of pixel P2 having the value s. In the embodiment of FIG. 2, all pixels in the region corresponding to the pixels indicated by hatching in size SI6 of FIG. 1 are used as second pixels for which a similarity measure is calculated.

After having determined the similarity measure for all second pixels in the neighborhood region of the first pixel, the value of the second pixel with the highest similarity according to the similarity measure is used for predicting the first pixel. This is described in more detail with respect to another embodiment that is shown in FIG. 3.

In this embodiment, a template TE corresponding to the size SI2 of FIG. 1 is used as is the case for the embodiment of FIG. 2. However, the neighborhood region defined in FIG. 3 is based on the size SI2 whereas size SI6 is used as neighborhood region in the embodiment of FIG. 2. The first pixel P1 to be predicted and the corresponding first patch PA1 based on the template TE are shown in the upper part of FIG. 3. The template TE includes four pixels adjacent to pixel P1 (e.g., an upper pixel AP1, a left pixel AP2, an upper left pixel AP3 and an upper-right pixel AP4). Those pixels also form second pixels P2 shown in the lower part of FIG. 2. Throughout FIG. 3, pixels referring to templates are indicated by white squares.

Figure 3:
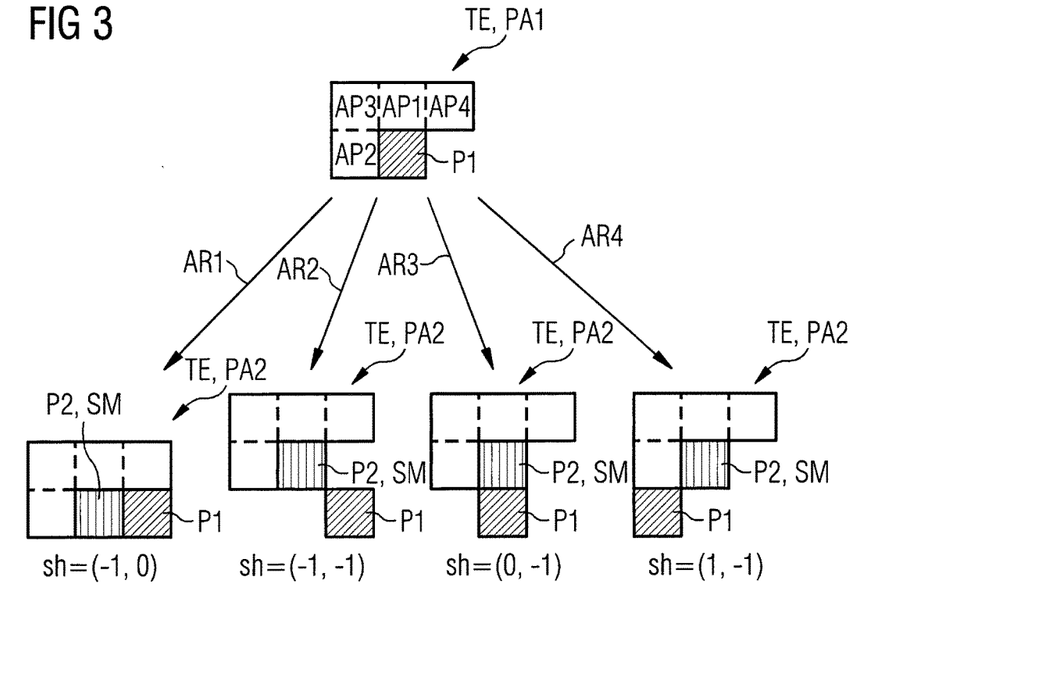
FIG. 3 illustrates the prediction of a pixel based on another embodiment.

According to FIG. 3, four second pixels P2 around the first pixel P1 with corresponding second patches PA2 are taken into account in order to calculate the similarity measures. Those four second pixels P2 and second patches PA2 are represented by arrows AR1 to AR4 being directed to the respective second pixels P2 surrounded by second patches PA2. Each second pixel is described by a shift sh=$(sh_x, sh_y)$, where $sh_x$ refers to the horizontal shift (e.g., in x direction) of the second pixel P2 with respect to pixel P1 and where $sh_y$ refers to the vertical shift (e.g., in y direction) of the second pixel P2 with respect to the first pixel P1. A positive shift in the horizontal direction refers to a shift to the right in the image, whereas a negative shift in the horizontal direction refers to a shift to the left in the image. Analogously, a positive shift in the vertical direction refers to a shift downwards in the image, whereas a negative shift in the vertical direction refers to a shift upwards in the image. The numbers of the corresponding shifts $sh_x$ and $sh_y$ indicate how many pixels a shift includes.

In the embodiment of FIG. 3, the second patch around the pixel P2 shifted by sh=(−1, 0), the second patch around pixel P2 shifted by shift sh=(−1, −1), the second patch around second pixel shifted by shift sh=(0, −1), and the second patch around second pixel shifted by shift sh=(1, −1) are compared with the first patch PA1 around first pixel P1. As mentioned above, this comparison is based on the sum of absolute differences between corresponding pixel values. This sum is also referred to as SAD in the following. Mathematically, the sum of the absolute differences for a first pixel i compared with a second pixel j may be expressed as follows:

$$SAD_{i,j} = \sum_{n \in N_0} |p[i+n] - p[j+n]|, \quad (1)$$

where i=(x, y) is the two-dimensional coordinate of the first pixel and j is the corresponding shifted two-dimensional coordinate of the second pixel. $N_0$ refers to the offsets defining a template. In FIG. 3, the offsets are identical to the shifts resulting in second pixels. In other words, $N_0$ is defined by the shifts sh and, thus, reads as follows:

$$N_0 = \{n = (x,y) | (-1,0), (-1,-1), (0,-1), (1,-1)\} \quad (2).$$

For predicting the first pixel, the second pixel of the shifted pixels having the patch with the lowest SAD value and, thus, with the highest similarity with the first patch is used. Thus, if the second pixel with the highest similarity is at the position j, then the predicted value $\hat{p}[i]$ of the first pixel at the position i corresponds to the value p[j] of the pixel j, in other words:

$$\hat{p}[i] = p[j] \quad (3).$$

If more than one second pixel has the same highest similarity (e.g., the same minimum SAD value), a predefined order is used to determine which of those pixels is used as a predictor. In the embodiment described herein, this order is as follows:

upper pixel, left pixel, upper-left pixel, and upper-right pixel. The SAD values of the second pixels are checked in this order, and the pixel in this order having at first the minimum SAD value is then used for predicting the corresponding first pixel.

The above described prediction mode based on the pixel having the highest similarity may be implemented in different ways. In one embodiment, the above described prediction scheme is used as an "Escape" solution for the prediction mode as described in "Intra prediction for lossless coding", by Peter Amon, Andreas Hutter, Eugen Wige, and André Kaup, ISO/IEC JTC1/SC29/WG11and ITU-T SG16 WP3, document JCTVC-L0161/M27497, Geneva, Switzerland, January 2013 and the International patent application No. PCT/EP2012/075988. In the prediction mode used in these documents, a weighted sum of the above described similarity measures is used as already mentioned before. The weights in the sum are defined such that those weights are monotonously decreasing in dependence on a decreasing similarity described by the similarity measure. In the Escape solution, the prediction method of the present embodiments based on the pixel with the highest similarity (e.g., the lowest SAD value) is used in case that all weights of the weighted sum according to the prediction mode of "Intra prediction for lossless coding", by Peter Amon, Andreas Hutter, Eugen Wige, and André Kaup, ISO/IEC JTC1/SC29/WG11and ITU-T SG16 WP3, document JCTVC-L0161/M27497, Geneva, Switzerland, January 2013 and patent application PCT/EP2012/075988 are 0.

In another implementation, the above described prediction mode based on the highest similarity may also be used as a stand-alone intra-prediction scheme. In other words, the prediction scheme is signaled as a separate prediction mode among other prediction types. In contrast to known directional prediction modes, the prediction mode based on the highest similarity does not need to signal the prediction direction in the coded video stream because the decoder automatically determines the prediction direction based on the method as described above.

In the following, the implementation of the above described prediction method in a conventional coding and decoding method, which may be based on the draft standard HEVC/H.265, is described.

Figure 4:
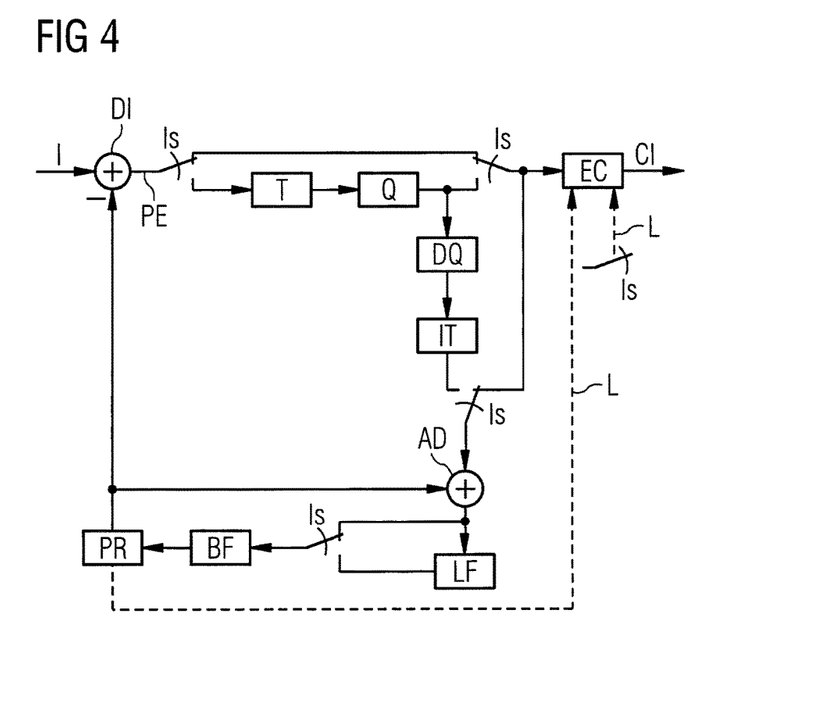
FIG. 4 is a schematic illustration of a coding method implementing the prediction mode according to embodiment.

FIG. 4 shows a block-based encoder receiving the sequence of images I to be decoded. The encoder includes at several positions a switch ls that is in a position describing a lossless coding mode that uses the prediction method of the present embodiments. In case that the switch ls is switched in a second position, a known coding is performed where a prediction error PE obtained by the differentiator is subjected to a transform T and a quantization Q. This prediction error is then subjected to an entropy encoding EC so that a sequence of coded images CI is obtained. During this conventional coding, another prediction method than the method of the present embodiments is used. To do so, the prediction error after quantization is dequantized (e.g., block DQ) and subjected to an inverse transform IT. This reconstructed prediction error is combined by adder AD with a prediction value from a prediction module PR so that reconstructed pixel values of the corresponding block are obtained. These reconstructed values are stored in a buffer BF and used for performing prediction in the prediction module PR. The predicted value calculated in the module PR is then fed to the differentiator DI to provide a prediction error PE. A loop filter LF is used for filtering the signal obtained by the adder AD. The loop filter block LF may refer to different loop filters, i.e. a deblocking filter, a sample adaptive offset (SAO), and the like.

In case that the lossless switch ls is put in the position as shown in FIG. 4, a lossless coding using the prediction method of the present embodiments is performed. To do so, the blocks for transform T, quantization Q, dequantization DQ, inverse transform IT, and loop filter LF are bypassed. In this mode, the reconstructed prediction error PE fed to the adder AD corresponds to the original prediction error PE. The values of pixels in the causal region used for prediction are the original pixels because the original pixel values are available during decoding as the coding is lossless.

Figure 5:
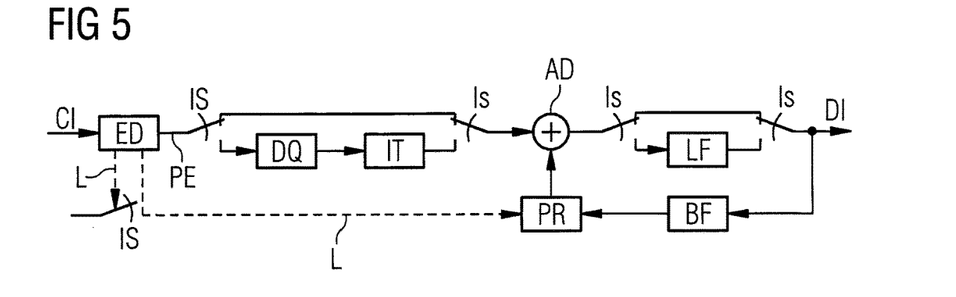
FIG. 5 is a schematic illustration of a decoding method implementing the prediction mode according to embodiment.

When using the lossless coding, the prediction method based on the above described algorithm is used in the prediction module PR. The dotted lines L in FIG. 5 illustrate the inclusion of parameters of the prediction in the lossless and lossy coding mode in the sequence of coded images. Those parameters are also subjected to entropy coding. The state of the above lossless switch ls may be signaled explicitly for each block, slice, frame, or sequence separately. However, the state may also be inferred for each block, slice, frame, or sequence from some other parameters (e.g., by using the quantization parameter QP). For example, in case that the quantization parameter has the value of 0, this may be the indication that the lossless mode is to be used.

FIG. 5 shows a decoder of the coded sequence of images CI obtained by the encoder of FIG. 5. At first, the images are subjected to an entropy decoding ED resulting in a prediction error PE. In case of a lossless encoding, the switches is are in the first positions as shown in FIG. 5. As a consequence, the prediction error is used directly by the prediction module PR. To do so, the original pixel value is obtained by the adder AD and stored in the buffer BF. The stored values in the buffer BF are used for further prediction by the prediction module PR. Eventually, the sequence of decoded images DI being identical to the original images I is obtained. In case of a lossy encoding, all switches is are put in the second position so that in a known manner a dequantization DQ, an inverse transform IT, and a loop filter LF are applied to the signal in order to perform another prediction in the prediction module PR. As a consequence, a decoded sequence of images is obtained where some information is lost due to quantization and transform. The dotted line L in FIG. 5 represents the provision of parameters originally included in the coded sequence of images that are needed by the predictor module PR to perform appropriate prediction. In the lossy coding mode, well-known prediction techniques based on INTRA as well as on INTER prediction may be used.

As mentioned above, the prediction method according to one or more of the present embodiments is to be implemented in the draft standard HEVC/H.264. In one embodiment, the prediction method is used for lossless coding as described above. If a corresponding coding unit is coded in a lossless way, the transform, quantization and loop filtering within the encoder are disabled as shown in FIG. 4. Similarly, the inverse transform, the dequantization, and the loop filtering are disabled within the decoder, too. The following options may be used in order to incorporate the prediction method according to one or more of the present embodiments into the HEVC syntax: a certain prediction mode for the prediction of the present embodiments is used in addition to the modes INTRA and INTER; a certain prediction type for the prediction of the present embodiments is used in addition to the defined prediction types in INTRA prediction; certain prediction modes or prediction types within the HEVC syntax are replaced by the prediction mode of the invention (e.g., replacement of the DC intra prediction mode or any other (directional) INTRA mode); a certain value (e.g. 0) is used for the quantization parameter in order to indicate the prediction mode of the present embodiments.

Different parameters of the prediction method according to the present embodiments may be sent as side information, particularly the patch form and the patch size as well as the neighborhood form and the neighborhood size. Those parameters may be sent frequently (e.g., for each picture, slice (partition of a picture), or coding unit in order to adapt to the statistics of the image signal). The parameters may also be sent only once for an image sequence or jointly for several images (e.g., within a parameter set like the sequence parameter set or the picture parameter set). As an alternative, the parameters may also be estimated by a defined algorithm. As another alternative, these parameters may be fixed in a certain profile and/or level of the standard and, thus, need not be transmitted or estimated at all.

The prediction method of the present embodiments may be used in block-wise coding methods as well as in pixel-based coding methods. Hence, the combination of different pixel-based prediction methods with the prediction method of the present embodiments may can be used. Furthermore, the prediction method of the present embodiments may also be used for lossy pixel-wise coding. To do so, the prediction mode is constructed as described before using the prediction algorithm of the present embodiments. Afterwards, the prediction error for the corresponding pixel is built which is quantized in order to achieve redundancy reduction. This procedure is performed for each pixel individually.

Figure 6:
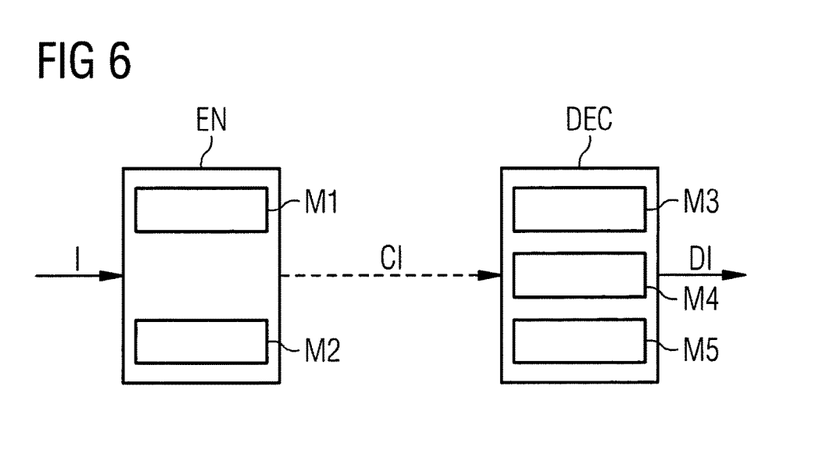
FIG. 6 is a schematic illustration of a coding and decoding apparatus according to an embodiment.

FIG. 6 shows a schematic illustration of a codec including a coding apparatus and a decoding apparatus using the prediction mode based on the present embodiments. In the scenario of FIG. 6, a sequence of images is fed to an encoder EN. For performing the prediction mode of the present embodiments, the encoder includes a device M1 for determining similarity measures. Based on a region of pixels with reconstructed values in a single image and for a template of an image area, this device compares a first patch of pixels in this region that surround a first pixel to be predicted based on the template with several second patches. Each second patch is assigned to a second pixel from a plurality of second pixels in the region and consists of pixels in the region that surround the second pixel based on the template. As a result, a similarity measure for each second pixel describing the similarity between reconstructed values of the pixels of the second patch assigned to the respective second pixel and the reconstructed values of the pixels of the first patch is determined.

The encoder further includes a device M2 for predicting values of first pixels. To do so, a predicted value of each first pixel is determined based on the values of one or more second pixels that have the highest similarity described by the similarity measure among all second pixels of the plurality of second pixels in the region.

Based on this prediction, a prediction error is obtained. The prediction error is transmitted as the coded sequence of images CI to a decoder DEC. In the decoder DEC, the prediction method used in the encoder is analogously implemented. For example, the decoder includes a device M3 for determining similarity measures. For a region of pixels with decoded values in a single image that have been determined previously in the decoding processing and for a template of an image area, this device compares a first patch of pixels in the region that surrounds the first pixel to be predicted based on the template with several second patches. Each of the second patches is assigned to a second pixel from a plurality of second pixels in the region and consists of pixels in the region that surround the second pixel based on the template. As a result, a similarity measure for each second pixel describing the similarity between decoded values of the pixels of the second patch assigned to the respective second pixel and the decoded values of the pixels of the first patch is determined.

The decoder DEC also includes a device M4 for predicting values of first pixels. To do so, a predicted value of each first pixel is determined based on the values of one or more second pixels that have the highest similarity described by the similarity measure among all second pixels of the plurality of second pixels in the region.

The decoder DEC also includes a device M5 for correcting the predicted value of the first pixel. To do so, the predicted value of the first pixel is corrected by the corresponding prediction error for the first pixel resulting in a decoded value of the first pixel. The prediction error is included in the received sequence of images CI. Eventually, a sequence of images DI is obtained by the decoder. The sequence of images DI corresponds to the original sequence of images I in case that a lossless coding and decoding has been used.

The present embodiments, as described above, have several advantages. For example, a backward-adaptive directional prediction is performed by using a single prediction mode. The prediction has a lower complexity than the prediction mode described in "Intra prediction for lossless coding", by Peter Amon, Andreas Hutter, Eugen Wige, and André Kaup, ISO/IEC JTC1/SC29/WG11and ITU-T SG16 WP3, document JCTVC-L0161/M27497, Geneva, Switzerland, January 2013 and International patent application No. PCT/EP2012/075988. The prediction mode of the present embodiments is also better suited for displaying certain kind of information (e.g., screen content (images from a computer display where the pixel values of the displayed information, letters) usually has a high difference with respect to the pixel values of the background). The prediction of the present embodiments may be used for remote desktop applications where a desktop of a computer is to be transmitted and visualized at the remote location. In such an application, the prediction mode of the present embodiments is used in order to compress the transmitted desktop images.

The prediction mode according to the present embodiments was tested for different classes of images. The results of those tests are shown in Table 1 below.

TABLE 1

| | Compression ration | | |
|---|---|---|---|
| | Reference | Tested | Bitrate saving |
| Class F | 4.6 | 5.3 | −11.2% |
| Calss B | 2.1 | 2.3 | −6.8% |
| SC (GBR) | 7.5 | 9.0 | −14.3% |
| RangeExt | 2.2 | 2.3 | −4.4% |
| Overall | 5.3 | 6.3 | −11.0% |

In Table 1, the column "Reference" refers to a prediction mode according to the prior art. The column "Tested" refers to a variant of the prediction mode being a combination of the above described Escape solution and a signaling of the prediction by a specific INTRA prediction mode. The lines "Class F", "Class B", "SC(GBR)" and "Range-Ext" refer to different classes of video streams. The line "Overall" refers to all of the above mentioned classes. As shown in Table 1, the compression ratio when using the method of the present embodiments is enhanced in comparison to a prior art method. This results in considerable bit-rate savings.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the describe embodiments. It is therefore intended that the foregoing description be regarded as illustrative rather than limiting, and that it be understood that all equivalents and/or combinations of embodiments are intended to be included in this description.

The invention claimed is:

1. A method for encoding a sequence of digital images, the method comprising:
   predicting values of pixels in the sequence of digital images based on reconstructed values of pixels in image areas processed previously, the predicting comprising using a number of prediction modes; and
   generating the encoded sequence of digital images, the generating comprising processing a prediction error, the prediction error being a difference between predicted values and original values of pixels,
   wherein a preset prediction mode is an intra-prediction mode based on pixels of a single image and is performed pixel-wise, the preset prediction mode comprising:
      comparing, for a region of pixels with reconstructed values in the single image and for a template of an image area, a first patch of pixels in the region that surround a single first pixel to be predicted based on the template with a plurality of second patches, each second patch of the plurality of second patches being assigned to a second pixel from a plurality of second pixels in the region and including pixels in the region that surround the second pixel based on the template, thereby determining a similarity measure for each second pixel describing the similarity between reconstructed values of the pixels of the second patch assigned to the respective second pixel and the reconstructed values of the pixels of the first patch; and
      determining a predicted value of the single first pixel based on the values of one or more second pixels that have a highest similarity described by the similarity measure among all second pixels of the plurality of second pixels in the region.

2. The method of claim 1, wherein in the determining, the predicted value of the single first pixel corresponds to the value of the single second pixel that has the highest similarity described by the similarity measure among all second pixels of the plurality of second pixels in the region,
   wherein when a plurality of second pixels has the highest similarity, the single second pixel is chosen by a predetermined order of second pixels in the plurality of second pixels, and
   wherein the single second pixel corresponds to the second pixel having at first the highest similarity in the predetermined order of second pixels.

3. The method of claim 1, wherein in the determining, the predicted value of the single first pixel is determined based on the values of all second pixels that have the highest similarity described by the similarity measure in the plurality of second pixel in the region,
   wherein when a single second pixel has the highest similarity, the predicted value of the single first pixel corresponds to the value of the single second pixel, and
   wherein when a plurality of second pixels have the highest similarity, the predicted value of the single first pixel is a combination of the values of the plurality of second pixels.

4. The method of claim 1, wherein the similarity measure is based on a sum of absolute differences between corresponding pixels in the first patch and the respective second patch.

5. The method of claim 2, wherein the single image is a two-dimensional image with pixels at a plurality of vertical and horizontal positions,
   wherein the plurality of second pixels in the region, the template, or the region and the template are defined such that the plurality of second pixels in the region, the template, or the region and the template surround a corresponding pixel by at least two adjacent pixels, wherein the corresponding pixel is the single first pixel in case of defining the plurality of second pixels in the region, and the corresponding pixel is the pixel surrounded by the first or second patch based on the template in case of defining a template, the at least two adjacent pixels comprising:
an upper adjacent pixel having a vertical position being offset upwards by one pixel with respect to the corresponding pixel and having the same horizontal position as the single first or second pixel in the single image; and
a left adjacent pixel having a horizontal position being offset to the left by one pixel with respect to the corresponding pixel and having the same vertical position as the corresponding pixel in the single image.

6. The method of claim 5, wherein the plurality of second pixels in the region, the template, or the region and the template further comprise:
an upper-right pixel having a vertical position being offset upwards by one pixel with respect to the corresponding pixel and having a horizontal position being offset to the right by one pixel with respect to the corresponding pixel in the single image.

7. The method of claim 5, wherein a predetermined order in the plurality of second pixels is:
the upper adjacent pixel, the left adjacent pixel, the upper-left pixel, and in case that the plurality of second pixels also comprises the upper-right pixel, the upper-right pixel; or
the upper adjacent pixel, in case that the plurality of second pixels also comprises the upper-right pixel, the upper-right pixel, the left adjacent pixel, the upper-left pixel.

8. The method of claim 1, wherein the preset prediction mode is used for lossless encoding of the sequence of images, and
wherein the reconstructed values of pixels are equal to the original values of pixels.

9. The method of claim 1, wherein the preset prediction mode is used for lossy encoding of the sequence of images.

10. The method of claim 9, wherein the lossy encoding includes a transform, a quantization of the prediction errors, or a combination thereof, and
wherein an inverse transform, a dequantization of the prediction errors, or a combination thereof is performed for determining reconstructed values of pixels.

11. The method of claim 1, wherein the processing of the prediction error includes an entropy encoding step.

12. The method of claim 1, wherein the method comprises another predetermined prediction mode other than the preset prediction mode, the other predetermined prediction mode comprising:
comparing, for the region of pixels with reconstructed values in the single image and for the template of the image area, the first patch of pixels in the region that surround the single first pixel to be predicted based on the template with the plurality of second patches, each second patch of the plurality of second patches being assigned to the second pixel from the plurality of second pixels in the region and including pixels in the region that surround the second pixel based on the template, thereby determining the similarity measure for each second pixel describing the similarity between reconstructed values of the pixels of the second patch assigned to the respective second pixel and the reconstructed values of the pixels of the first patch; and
determining a predicted value of the single first pixel based on a weighted sum of values of the second pixels of the plurality of second pixels in the region, wherein the value of each second pixel is weighted by a weighting factor, wherein the preset prediction mode is used for the single first pixel as an alternative to the other predetermined prediction mode in case that all weighting factors of the weighted sum are zero.

13. The method of claim 1, wherein one or more parameters of the preset prediction mode are fixed, variable, or fixed and variable, and
wherein the one or more parameters comprise form and size of the template, form and size of the region, one or more parameters referring to a determination of similarity measures, a determination of predicted values of the single first pixel, or any combination thereof.

14. The method of claim 1, wherein the preset prediction mode, parameters of the preset prediction mode, or a combination thereof is signaled in the encoded sequence of images.

15. The method of claim 1, wherein the preset prediction mode is used as a prediction mode in the standard HEVC/H.265.

16. A method for decoding a sequence of digital images that is encoded by a method for encoding the sequence of digital images, the method comprising:
reconstructing a prediction error from an encoded sequence of images; and
subjecting values of pixels in the encoded sequence of images that are processed by a preset prediction mode that is performed pixel-wise during encoding to a decoding processing, the decoding processing comprising:
comparing, for a region of pixels with decoded values in a single image that have been determined previously in the decoding processing and for a template of an image area, a first patch of pixels in a region that surrounds a single first pixel to be predicted based on the template with a plurality of second patches, thereby determining a similarity measure for each second pixel describing the similarity between decoded values of the pixels of the second patch assigned to the respective second pixel and the decoded values of the pixels of the first patch;
determining a predicted value of the single first pixel based on the values of one or more second pixels that have the highest similarity described by the similarity measure among all the second pixels of the plurality of second pixels in the region;
correcting the predicted value of the single first pixel by the corresponding reconstructed prediction error for the single first pixel, resulting in a decoded value of the single first pixel.

17. A method for encoding and decoding a sequence of digital images, the method comprising:
encoding the sequence of digital images, the encoding comprising:
predicting values of pixels in the sequence of digital images based on reconstructed values of pixels in image areas processed previously, the predicting comprising using a number of prediction modes; and
processing a prediction error between predicted values and original values of pixels for generating an encoded sequence of digital images, wherein a preset prediction mode is an intra-prediction mode based on pixels of a single image and is performed pixel-wise, the preset prediction mode comprising:

comparing, for a region of pixels with reconstructed values in the single image and for a template of an image area, a first patch of pixels in the region that surround a single first pixel to be predicted based on the template with a plurality of second patches, each second patch of the plurality of second patches being assigned to a second pixel from a plurality of second pixels in the region and including pixels in the region that surround the second pixel based on the template, thereby determining a similarity measure for each second pixel describing the similarity between reconstructed values of the pixels of the second patch assigned to the respective second pixel and the reconstructed values of the pixels of the first patch; and determining a predicted value of the single first pixel based on the values of one or more second pixels that have a highest similarity described by the similarity measure among all second pixels of the plurality of second pixels in the region;

decoding the encoded sequence of digital images, the decoding comprising:

reconstructing the prediction error from the encoded sequence of images; and subjecting the values of the pixels in the encoded sequence of images that are processed by the preset prediction mode during encoding to a decoding processing, the decoding processing comprising:

comparing, for a region of pixels with decoded values in the single image that have been determined previously in the decoding processing and for the template of the image area, the first patch of pixels in the region that surrounds the single first pixel to be predicted based on the template with the plurality of second patches, thereby determining a similarity measure for each second pixel describing the similarity between decoded values of the pixels of the second patch assigned to the respective second pixel and the decoded values of the pixels of the first patch;

determining the predicted value of the single first pixel based the values of one or more second pixels that have the highest similarity described by the similarity measure among all second pixels of the plurality of second pixels in the region;

correcting the predicted value of the single first pixel by the corresponding reconstructed prediction error for the single first pixel, resulting in a decoded value of the single first pixel.

18. An apparatus for encoding a sequence of images, the apparatus comprising:

a hardware computer configured to:

perform a number of prediction modes for predicting values of pixels in the sequence of images based on reconstructed values of pixels in image areas processed previously; and process a prediction error obtained by a differentiator with a quantizer and a transform for generating an encoded sequence of digital images by an entropy encoding, wherein the prediction error is a difference between predicted values and original values of pixels;

perform a preset prediction mode that is an intra-prediction mode based on pixels of a single image and is performed pixel-wise, the performance of the preset prediction mode comprising:

determination of similarity measures, the determination of the similarity measures comprising for a region of pixels with reconstructed values in the single image and for a template of an image area, a comparison of a first patch of pixels in the region that surround a single first pixel to be predicted based on the template with a plurality of second patches, each second patch of the plurality of second patches being assigned to a second pixel from a plurality of second pixels in the region and including pixels in the region that surround the second pixel based on the template, thereby determining a similarity measure for each second pixel describing the similarity between reconstructed values of the pixels of the second patch assigned to the respective second pixel and the reconstructed values of the pixels of the first patch;

prediction of values of the single first pixel, the prediction comprising a determination of a predicted value of the single first pixel based on the values of one or more second pixels that have the highest similarity described by the similarity measure among all second pixels of the plurality of second pixels in the region.

19. An apparatus for decoding a sequence of digital images that is encoded by a method for encoding the sequence of digital images, the apparatus comprising:

a decoder configured to reconstruct a prediction error from an encoded sequence of images and to decode values of pixels in the encoded sequence of images that are processed by a preset prediction mode that is performed pixel-wise during encoding, wherein the decoder comprises:

a determiner configured to determine similarity measures, the determiner being further configured to compare, for a region of pixels with decoded values in a single image that have been determined previously in the decoding processing and for a template of the image area, a first patch of pixels in a region that surround a single first pixel to be predicted based on the template with a plurality of second patches, each second patch of the plurality of second patches being assigned to a second pixel from a plurality of second pixels in the region and including pixels in the region that surround the second pixel based on the template, thereby determining a similarity measure for each second pixel describing the similarity between decoded values of the pixels of the second patch assigned to the respective second pixel and the decoded values of the pixels of the first patch;

a predictor configured to predict values of the single first pixel, the predictor being further configured to determine a predicted value of the single first pixel based on the values of one or more second pixels that have the highest similarity described by the similarity measure among all the second pixels of the plurality of second pixels in the region;

a corrector configured to correct the predicted values of the single first pixel, the corrector being further configured to correct the predicted value of the single first pixel by the corresponding reconstructed prediction error for the single first pixel resulting in a decoded value of the single first pixel.

20. A codec for encoding and decoding a sequence of digital images, the codec comprising:

an encoding apparatus for encoding a sequence of images, the encoding apparatus comprising a hardware computer configured to perform a number of prediction modes for predicting values of pixels in the sequence of images based on reconstructed values of pixels in image areas processed previously, configured to process a prediction error between predicted values and original values of pixels for generating an encoded sequence of digital images, and configured to perform a preset prediction mode that is an intra-prediction mode based on pixels of a single image and is performed pixel-wise, the performance of the preset prediction mode comprising determination of similarity measures, the determination of the similarity measures comprising, for a region of pixels with reconstructed values in the single image and for a template of an image area, a comparison of a first patch of pixels in the region that surround a single first pixel to be predicted based on the template with a plurality of second patches, each second patch of the plurality of second patches being assigned to a second pixel from a plurality of second pixels in the region and including pixels in the region that surround the second pixel based on the template, thereby determining a similarity measure for each second pixel describing the similarity between reconstructed values of the pixels of the second patch assigned to the respective second pixel and the reconstructed values of the pixels of the first patch, the performance of the preset prediction mode further comprising prediction of values of the single first pixel, the prediction comprising a determination of a predicted value of the single first pixel based on the values of one or more second pixels that have the highest similarity described by the similarity measure among all second pixels of the plurality of second pixels in the region; and a decoding apparatus for decoding the sequence of digital images that is encoded by the encoding apparatus, the decoding apparatus comprising a decoder configured to reconstruct the prediction error from the encoded sequence of images and to decode the values of the pixels in the encoded sequence of images that are processed by the preset prediction mode during encoding, wherein the decoder comprises a determiner configured to determine similarity measures, the determiner being further configured to compare, for a region of pixels with decoded values in the single image that have been determined previously in the decoding processing and for the template of the image area, a first patch of pixels in the region that surround the single first pixel to be predicted based on the template with a plurality of second patches, each second patch of the plurality of second patches being assigned to a second pixel from a plurality of second pixels in the region and including pixels in the region that surround the second pixel based on the template, thereby determining a similarity measure for each second pixel describing the similarity between decoded values of the pixels of the second patch assigned to the respective second pixel and the decoded values of the pixels of the first patch, the decoding apparatus further comprising a predictor configured to predict values of the single first pixel, the predictor being further configured to determine the predicted value of the single first pixel based on the values of one or more second pixels that have the highest similarity described by the similarity measure among all second pixels of the plurality of second pixels in the region, the decoding apparatus further comprising a corrector configured to correct the predicted values of the single first pixel, the corrector being further configured to correct the predicted value of the single first pixel by the corresponding reconstructed prediction error for the single first pixel resulting in a decoded value of the single first pixel.

21. The method of claim 5, wherein the at least two adjacent pixels comprise an upper-left pixel having a vertical position being offset upwards by one pixel with respect to the corresponding pixel and having a horizontal position being offset to the left by one pixel with respect to the corresponding pixel in the single image.

* * * * *